(12) United States Patent
Lavy et al.

(10) Patent No.: US 6,708,680 B2
(45) Date of Patent: Mar. 23, 2004

(54) PROCESS INTENDED FOR SELF-IGNITION CONTROL IN A FOUR-STROKE ENGINE

(75) Inventors: Jacques Lavy, Guillancourt (FR); Jean-Charles Dabadie, Rueil-Malmaison (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 218 days.

(21) Appl. No.: 09/971,579

(22) Filed: Oct. 9, 2001

(65) Prior Publication Data

US 2002/0040703 A1 Apr. 11, 2002

(30) Foreign Application Priority Data

Oct. 9, 2000 (FR) .......................................... 00 12962

(51) Int. Cl.7 ................................................ F02B 23/00
(52) U.S. Cl. .................. 123/586.14; 123/315; 123/308
(58) Field of Search ........................... 123/568.14, 315, 123/308, 568.11, 568.12, 568.13, 568.15, 568.19

(56) References Cited

U.S. PATENT DOCUMENTS

| | | | | |
|---|---|---|---|---|
| 4,354,463 A | * | 10/1982 | Otani et al. .................. | 123/308 |
| 5,243,938 A | * | 9/1993 | Yan .......................... | 123/197.1 |
| 5,682,854 A | | 11/1997 | Ozawa ........................ | 123/316 |
| 6,082,328 A | | 7/2000 | Meistrick et al. ............ | 123/321 |
| 6,257,183 B1 | * | 7/2001 | Vorih et al. ............... | 123/90.12 |
| 6,311,653 B1 | * | 11/2001 | Hamamoto ............... | 123/90.11 |
| 6,401,188 B1 | * | 6/2002 | Benayoun et al. .......... | 711/217 |

FOREIGN PATENT DOCUMENTS

| | | |
|---|---|---|
| DE | 19808574 | 9/1999 |
| DE | 19952093 | 8/2000 |
| EP | 0470869 | 2/1992 |
| FR | 2703107 | 9/1994 |
| GB | 2328975 | 3/1999 |
| WO | 9942718 | 8/1999 |
| WO | 0028197 | 5/2000 |

* cited by examiner

*Primary Examiner*—John Kwon
(74) *Attorney, Agent, or Firm*—Antonelli, Terry, Stout & Kraus, LLP

(57) ABSTRACT

Self-ignition control in a four-stroke internal-combustion engine, comprising several intake means and several exhaust means per cylinder. In order to reduce nitrogen oxide emissions during part-load operation, the exhaust means of each cylinder open (1 and 2) respectively during the exhaust phase so as to discharge the burnt gases from the cylinder and during the intake phase so as to reintroduce burnt gases into the cylinder, the time of opening (3) of an intake means being deferred so to allow fresh gas to pass into the cylinder after partial filling thereof with the burnt gases.

31 Claims, 1 Drawing Sheet

PROCESS INTENDED FOR SELF-IGNITION CONTROL IN A FOUR-STROKE ENGINE

BACKGROUND OF THE INVENTION

Field of the Invention

The invention relates to a self-ignition control in a four-stroke internal-combustion engine.

It is already known from EP-A-0,863,301 to control the intake and exhaust valves of the cylinders of a four-stroke engine so as to hold back in the cylinders a certain amount of burnt gases prior to allowing fresh gas to pass into the cylinders, by controlling the amount of burnt gases kept therein and by minimizing mixing thereof with fresh gas, so that self-ignition of the fresh gases is initiated in the combustion chambers by the burnt gases which are at a high temperature and contain active species. The open period of the exhaust valves of the cylinders can therefore be reduced. In a variant, the exhaust valves can remain open for a longer time so as to reintroduce burnt gases into the cylinders when the pistons are displaced from the top dead center to the bottom dead center thereof, and opening of the intake valves is delayed accordingly.

These particular controls of the intake and exhaust valves are used during part-load operation of the engine with controlled self-ignition, which leads to a substantial reduction in the discharge of nitrogen oxides to the atmosphere and in the consumption whereas, at high load, one reverts to a conventional control of the valves and to spark ignition.

The present invention applies self-ignition techniques to a four-stroke engine equipped with several exhaust valves and several intake valves per cylinder, by means of an exhaust and intake valve control process that is simple, effective and easy to implement.

SUMMARY OF THE INVENTION

The invention is a process using self-ignition control in a four-stroke internal-combustion engine, wherein exhaust means of the cylinders are controlled so that the cylinders are filled partly with burnt gases and partly with fresh gases for the compression phases when the engine runs at partial load. Each cylinder is equipped with at least two exhaust means such as valves. Opening and closing each one of the two exhaust means of a cylinder are controlled differently so as to ensure discharge of the burnt gases from the cylinder during the exhaust phase and reintroduction of burnt gases into the cylinder during the intake phase when the piston is displaced from the top dead center to the bottom dead center thereof.

The process according to the invention therefore differentiates and dissociates the functions of the two exhaust means of each cylinder, so as to obtain a large amount of burnt gases in the cylinder, and easier control of the opening and closing cycles.

In an embodiment of the invention, a first exhaust means of the cylinder is open and the other is closed during the exhaust phase when the piston is displaced from the bottom dead center to the top dead center thereof, then the first exhaust means is closed and the other is open at the beginning of the intake phase when the piston is displaced from the top dead center to the bottom dead center thereof.

In a variant, the two exhaust means of the cylinder can be open during the exhaust phase when the piston is displaced from the bottom dead center to the top dead center thereof, then one of the exhaust means is closed and the other is kept open at the beginning of the intake phase when the piston is displaced from the top dead center to the bottom dead center thereof.

Furthermore, reintroduction of burnt gases into the cylinder during the intake phase and intake of fresh gas into the cylinder can take place almost at the same time, which saves changing intake means control.

In a variant, there is a lag between reintroduction of burnt gases in the cylinder and intake of fresh gas in the cylinder, reintroduction of burnt gases in the cylinder starting before intake of fresh gases.

Mixing of the burnt gases and of the fresh gases in the cylinder is thus reduced, which can favor self-ignition of fresh gases in the cylinder under certain operating conditions.

Reintroduction of the burnt gases into the cylinder preferably ends with closing of the exhaust means left open, before the end of the fresh gas intake in the cylinder.

When the engine is equipped with several intake means per cylinder, the fresh gases can be allowed to pass into the cylinder through only one intake means.

This intake means is preferably arranged directly opposite the exhaust means that is in closed position during the intake phase, in cases where the operating conditions impose limitation of fresh gas and burnt gas mixing. In the opposite case, the intake means is arranged directly opposite the exhaust means that is in the open position during the intake phase, in order to favor mixing of the gases.

In another variant, both intake means are used, notably to favor mixing of the gases.

More generally, the process according to the invention allows reintroduction into a cylinder a sufficient amount of burnt gases to initiate self-ignition of the fresh gases allowed to pass into the cylinder thereafter. Discharge of the burnt gases from the cylinder during the exhaust phase and reintroduction thereof into the cylinder during the intake phase allows saving recompressing the burnt gases in the cylinder when the piston is displaced from the bottom dead center to the top dead center thereof during the exhaust phase, which would lead to thermal losses and increase the work of the low-pressure loop.

BRIEF DESCRIPTION OF THE DRAWINGS

Other features, details and advantages of the invention will be clear from reading the description hereafter, given by way of non limitative example, with reference to the accompanying drawings wherein.

DETAILED DESCRIPTION

Figure 1:
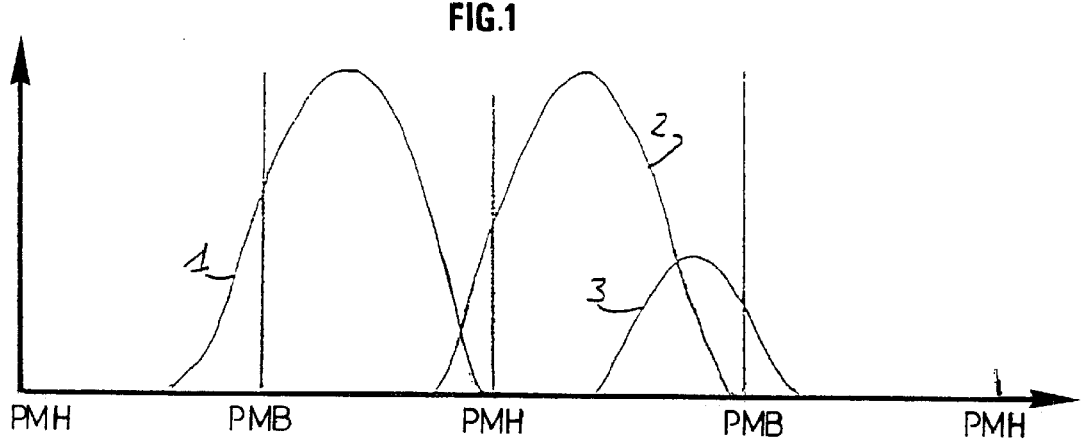
FIG. 1 diagrammatically shows a control process according to the invention for controlling the exhaust valves of a cylinder of a four-stroke internal-combustion engine, FIG. 2 diagrammatically shows a variant of the process according to the invention, FIG. 3 diagrammatically shows an example of arrangement of the intake valves and of the exhaust valves on a cylinder head.

The method of operation of a first embodiment of the invention is diagrammatically illustrated in FIG. 1, which shows the lifts of the two exhaust valves and of an intake valve of a four-stroke internal-combustion engine during the various expansion, exhaust, intake and compression phases of the engine cycle in which self-ignition of fresh gases introduced in the cylinder occurs at partial load.

In FIG. 1, curve 1 shows the lift of an exhaust valve E1 of a cylinder head C (FIG. 3), curve 2 shows the lift of second exhaust valve E2 of this cylinder, and curve 3 shows the lift of an intake valve A1 of this cylinder.

Figure 3:
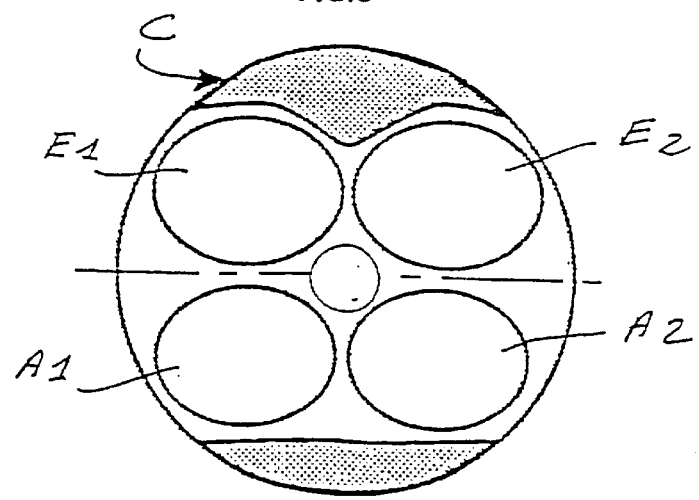

According to FIG. 3, there may be several intake valves, in particular two: A1 and A2.

Exhaust valve E1 is conventionally controlled and it is open during the exhaust phase, the lift of this valve starting substantially towards the end of the expansion phase when the piston is in the vicinity of its bottom dead center and ending at the end of the exhaust phase when the piston is in the vicinity of its top dead center.

The lift of exhaust valve E2 starts before the end of the exhaust phase and it ends towards the end of the intake phase, when the piston is in the vicinity of its bottom dead center. The closing end thus allows to control the proportion of residual gas.

The lift of intake valve A1 starts almost as exhaust valve E2 closes so as to minimize fresh gas/burnt gas mixing and it ends at the beginning of the compression phase, when the piston starts being moved from the bottom dead center to the top dead center thereof. The displacement overlap of these valves can help control fresh gas/burnt gas mixing.

During the exhaust phase, the burnt gases are driven out of the cylinder by the piston which is displaced towards its top dead center and they flow out of the cylinder through exhaust valve E1. During the next intake phase, part of the burnt gases is reintroduced into the cylinder through exhaust valve E2 which is open, and it fills part of the cylinder as the piston moves towards its bottom dead center, then fresh gases are allowed to pass into the cylinder through intake valve A1, substantially until the end of the intake phase. The fresh gases thus fed into the combustion chamber do not mix substantially with the burnt gases previously reintroduced into the cylinder. During the compression phase, the exhaust and intake valves are closed so that the combination of the pressure, of the high temperature of the burnt gases and of the presence of reactive species in the latter can lead to self-ignition of the fresh gases in the combustion chamber of the cylinder.

It can be seen in FIG. 1 that opening and closing of the two exhaust valves of the cylinder are controlled alternately and that these valves have different functions, one being intended for discharge of the burnt gases from the cylinder, the other for reintroduction of the burnt gases into the cylinder. It is possible to switch from normal operation, where the two exhaust valves are opened and closed simultaneously, to the operation according to the invention illustrated in FIG. 1, by modifying the control mode of exhaust valve E2. Similarly, the method of operation illustrated in FIG. 1 can be obtained simply by deferring the opening of intake valve A1 while keeping the same closing time.

In the method of operation described above, intake valve A2 remains permanently closed.

This method of operation is also advantageous in that none of the two exhaust valves is completely lifted when the piston is at the top dead center, which prevents any risk of interference of these valves with the piston crown.

It can also be noted that, of the two intake valves A1 and A2, the one that is used for intake of fresh gases while the engine works at partial load and under self-ignition conditions is the one that is arranged directly opposite exhaust valve E1, that is the exhaust valve that is closed during the intake phase.

The invention also applies according to FIG. 1 if valve E2 closes substantially at the same time as the intake valve.

In a variant diagrammatically shown in FIG. 2, exhaust valve E1 is controlled as already described in connection with FIG. 1, but the lift of exhaust valve E2 starts almost at the same time as that of exhaust valve E1 and it is extended substantially during the end of the intake phase. The mode of control of intake valve A1 is not modified, as shown by curve 3.

In this embodiment, the lift of exhaust valve E2 lasts longer and starts earlier than in the embodiment illustrated in FIG. 1, and it ends almost at the same time, so that a larger amount of burnt gases is discharged from the cylinder during the exhaust phase.

Figure 2:
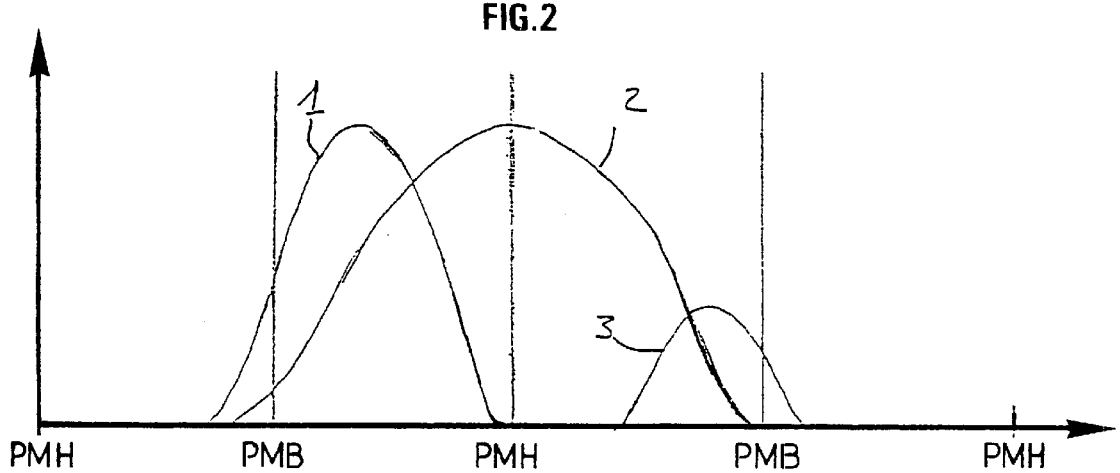

The method of operation shown in FIG. 2 can be reached from the commonly used method of operation when the engine is at full load, by not changing the control mode of exhaust valve E1, by changing the control mode of exhaust valve E2 so as to extend its lift time substantially until the end of the intake phase, by changing the lift of intake valve A1 and by preventing the lift of intake valve A2.

In another variant, it is possible not to change the control mode of intake valve A1 so that reintroduction of burnt gases into the cylinder and intake of fresh gases in this cylinder will take place almost simultaneously.

Of course, the process according to the invention is applicable in cases where the exhaust and intake means comprise rotary valves instead of valves with a reciprocating linear displacement.

What is claimed is:

1. A process of self-ignition control in a four-stroke internal-combustion engine, comprising controlling exhaust and intake means of cylinders so that the cylinders are filled partly with burnt gases and partly with fresh gases for the compression phase when the engine runs with the fresh gasses being self-ignited at partial load, wherein each cylinder is equipped with at least two exhaust means with opening and closing of each one of the two exhaust means of a cylinder are controlled differently to cause discharge of the burnt gases from the cylinder during the exhaust phase and reintroduction of burnt gases into the cylinder during an intake phase when the piston is displaced from top dead center to bottom dead center thereof followed by self-ignition during the compression phase at partial load.

2. A process as claimed in claim 1, wherein one of the exhaust means is closed when the other exhaust means is open during the intake phase.

3. A process as claimed in claim 1, wherein a first exhaust means of the cylinder is open and the other exhaust means is closed during the exhaust phase when a piston of the cylinder is displaced from the bottom dead center to the top dead center thereof, then one exhaust means is closed and the another exhaust means is open at a beginning of the intake phase.

4. A process as claimed in claim 2, wherein a first exhaust means of the cylinder is open and the other exhaust means is closed during the exhaust phase when a piston of the cylinder is displaced from the bottom dead center to the top dead center thereof, then one exhaust means is closed and the another exhaust means is open at a beginning of the intake phase.

5. A process as claimed in claim 1, wherein both exhaust means are open during the exhaust phase when the piston is displaced from bottom dead center to top dead center thereof, then one exhaust means is closed and another exhaust means is left open during the intake phase.

6. A process as claimed in claim 2, wherein both exhaust means are open during the exhaust phase when the piston is displaced from bottom dead center to top dead center thereof, then one exhaust means is closed and the another exhaust means is left open during the intake phase.

7. A process as claimed in claim 1, wherein reintroduction of burnt gases and intake of fresh gases into the cylinder are approximately simultaneous.

8. A process as claimed in claim 2, wherein reintroduction of burnt gases and intake of fresh gases into the cylinder are approximately simultaneous.

9. A process as claimed in claim 3, wherein reintroduction of burnt gases and intake of fresh gases into the cylinder are approximately simultaneous.

10. A process as claimed in claim 4, wherein reintroduction of burnt gases and intake of fresh gases into the cylinder are approximately simultaneous.

11. A process as claimed in claim 5, wherein reintroduction of burnt gases and intake of fresh gases into the cylinder are approximately simultaneous.

12. A process as claimed in claim 6, wherein reintroduction of burnt gases and intake of fresh gases into the cylinder are approximately simultaneous.

13. A process as claimed in claim 1, wherein there is a lag between reintroduction of burnt gases and intake of fresh gases into the cylinder with burnt gas reintroduction starting prior to fresh gas intake.

14. A process as claimed in claim 2, wherein there is a lag between reintroduction of burnt gases and intake of fresh gases into the cylinder with burnt gas reintroduction starting prior to fresh gas intake.

15. A process as claimed in claim 3, wherein there is a lag between reintroduction of burnt gases and intake of fresh gases into the cylinder with burnt gas reintroduction starting prior to fresh gas intake.

16. A process as claimed in claim 4, wherein there is a lag between reintroduction of burnt gases and intake of fresh gases into the cylinder with burnt gas reintroduction starting prior to fresh gas intake.

17. A process as claimed in claim 5, wherein there is a lag between reintroduction of burnt gases and intake of fresh gases into the cylinder with burnt gas reintroduction starting prior to fresh gas intake.

18. A process as claimed in claim 6, wherein there is a lag between reintroduction of burnt gases and intake of fresh gases into the cylinder with burnt gas reintroduction starting prior to fresh gas intake.

19. A process as claimed in claim 7, wherein there is a lag between reintroduction of burnt gases and intake of fresh gases into the cylinder with burnt gas reintroduction starting prior to fresh gas intake.

20. A process as claimed in claim 8, wherein there is a lag between reintroduction of burnt gases and intake of fresh gases into the cylinder with burnt gas reintroduction starting prior to fresh gas intake.

21. A process as claimed in claim 9, wherein there is a lag between reintroduction of burnt gases and intake of fresh gases into the cylinder with burnt gas reintroduction starting prior to fresh gas intake.

22. A process as claimed in claim 10, wherein there is a lag between reintroduction of burnt gases and intake of fresh gases into the cylinder with burnt gas reintroduction starting prior to fresh gas intake.

23. A process as claimed in claim 11, wherein there is a lag between reintroduction of burnt gases and intake of fresh gases into the cylinder with burnt gas reintroduction starting prior to fresh gas intake.

24. A process as claimed in claim 12, wherein there is a lag between reintroduction of burnt gases and intake of fresh gases into the cylinder with burnt gas reintroduction starting prior to fresh gas intake.

25. A process as claimed in claim 13, wherein reintroduction of burnt gases into the cylinder ends with closing of one exhaust means which is open at a beginning of the intake phase towards an end of the intake of fresh gases into the cylinder.

26. A process as claimed in claim 13, wherein intake of fresh gases into the cylinder starts before an end of the reintroduction of burnt gases in the cylinder.

27. A process as claimed in claim 25, wherein intake of fresh gases into the cylinder starts before an end of the reintroduction of burnt gases in the cylinder.

28. A process as claimed in claim 1, wherein the engine includes plural intake means per cylinder and fresh gases are allowed to pass into the cylinder through only one intake means when the engine runs at partial load.

29. A process as claimed in claim 26, wherein one intake means through which the fresh gases pass is arranged directly opposite one exhaust means of the cylinder that is in closed position during the intake phase when working conditions occur under which mixing of the fresh gases and of the burnt gases requires limitation.

30. A process as claimed in claim 28, wherein one intake means through which the fresh gases pass is arranged directly opposite one exhaust means of the cylinder that is in an open position during the intake phase when working conditions occur under which mixing of fresh gases and of burnt gases is favored.

31. A process as claimed in claim 30, wherein intake means are open during the intake phase.

\* \* \* \* \*